United States Patent
Blanche et al.

(10) Patent No.: US 6,581,783 B2
(45) Date of Patent: Jun. 24, 2003

(54) FINE SOLIDS SEPARATOR

(75) Inventors: Paul George Blanche, Rosebud (AU); Brian Philip Formby, Mt. Eliza (AU); Hongshun Li, Rowville (AU)

(73) Assignee: CDS PTY LTD, Mornington (AU)

( * ) Notice: Subject to any disclaimer, the term of this patent is extended or adjusted under 35 U.S.C. 154(b) by 0 days.

(21) Appl. No.: 09/858,586

(22) Filed: May 17, 2001

(65) Prior Publication Data

US 2002/0008060 A1 Jan. 24, 2002

(30) Foreign Application Priority Data

May 18, 2000 (AU) .............................................. PQ7582

(51) Int. Cl.⁷ .......................... B01D 33/11; B01D 33/50; B01D 33/70
(52) U.S. Cl. ........................ 210/383; 210/393; 210/394; 210/397; 210/408
(58) Field of Search ................................. 210/359, 383, 210/391, 393, 394, 396, 397, 400, 407, 408, 409, 411, 412

(56) References Cited

U.S. PATENT DOCUMENTS

| | | | | |
|---|---|---|---|---|
| 1,219,290 A | * | 3/1917 | Goyne et al. ............... | 210/314 |
| 2,667,270 A | * | 1/1954 | Cady et al. .................. | 210/196 |
| 4,022,691 A |   | 5/1977 | Heinrich ..................... | 210/202 |
| 4,130,478 A |   | 12/1978 | Swallow ..................... | 209/254 |
| 4,178,246 A |   | 12/1979 | Klein .......................... | 210/82 |
| 4,417,980 A | * | 11/1983 | Baur et al. .................... | 210/91 |
| 4,762,615 A | * | 8/1988 | Drori ..................... | 210/333.01 |
| 5,085,771 A | * | 2/1992 | Huang ........................ | 210/332 |
| 5,540,844 A |   | 7/1996 | Meylor et al. .............. | 210/703 |

FOREIGN PATENT DOCUMENTS

| EP | 0 599 324 | 6/1994 |
|---|---|---|
| EP | 1 118 367 | 7/2001 |
| WO | WO 99/67006 | 12/1999 |

* cited by examiner

Primary Examiner—Fred Prince
(74) Attorney, Agent, or Firm—Fitzpatrick, Cella, Harper & Scinto

(57) ABSTRACT

A fine solids separator 10 including a hollow housing 12 having a generally cylindrical wall 11. Located within the housing 12 is a cylindrical screen member 15 that is preferably formed of expanded metal mesh. The screen member 15 encloses a chamber 22 to which a flocculated sewage is delivered by means of an inlet duct 23. Located within the chamber 22 is an impeller 26 which at least aids circulation of liquid within the chamber 22 about the longitudinal axis of the chamber 22. Liquid leaves the chamber 22 via the screen member 15 and an outlet 25 extending from an outlet chamber 24 located between the member 15 and housing 12.

29 Claims, 2 Drawing Sheets

FINE SOLIDS SEPARATOR

TECHNICAL FIELD

The present invention relates to an apparatus and method to remove solid materials from a body of liquid and more particularly but not exclusively, to the removal of fine solids from raw sewage.

BACKGROUND OF THE INVENTION

Described in Australian patents 728181 and 727926 are methods and apparatus for separating solids from flowing liquids or gases. The apparatus particularly employ screens formed of expanded metal mesh over which the liquid passes under controlled hydraulic conditions. The liquid passes through the mesh while solid materials entrained in the liquid are retained by the mesh. Movement of liquid over the expanded metal mesh provides a washing effect, which ensures that there is no attachment of solids to the screen so that the liquid may pass therethrough and that no blinding of the screen occurs as a result. These apparatus are particularly adapted to remove gross solids from liquids at high flow rates.

The above-described apparatus cannot be easily applied to the separation of fine solids or solids of neutral density, which either tend to pass through or accumulate in the apertures of the screen and result in blinding thereof.

OBJECT OF THE INVENTION

It is the object of the present invention to overcome or substantially ameliorate at least one of the above disadvantages.

SUMMARY OF THE INVENTION

There is disclosed herein an apparatus to remove solid material from a body of liquid, said apparatus including:
- a wall providing a chamber to receive the liquid, said wall including an apertured portion through which the liquid leaves the chamber, the apertured portion being adapted to remove solid material greater than a predetermined size from liquid passing through the apertured portion;
- a housing generally surrounding said wall and co-operating therewith to provide a space into which the liquid flows from said wall;
- liquid drive means to at least partly cause movement of the liquid in the chamber so that liquid passes the apertured portion to aid in removing solid material therefrom; and
- means to remove the solid material from within the chamber; and
- an outlet extending from said space so as to maintain a level of liquid in said space.

Preferably, said wall includes a side wall of a cylindrical configuration with substantially the entire wall providing said apertured portion. Preferably, the cylindrical wall is made of expanded metal mesh.

Preferably, the means to cause movement of liquid in the chamber moves the liquid angularly about the longitudinal axis of the cylindrical wall.

Preferably, the cylindrical wall is movably mounted for angular movement about said axis, and the apparatus includes means to direct a stream of fluid tangentially toward said cylindrical wall.

Preferably, the liquid drive means augments movement of the incoming liquid and is an impeller rotated about the axis of the cylindrical wall.

Preferably, said apparatus is adapted to receive flocculated sewage, with the apparatus including a threshold member above which floc material passes to be removed from the chamber. Preferably, a scraper member is operatively associated with the threshold member to aid in removing the floc material.

Preferably the above apparatus is a fine solids separator adapted to remove fine solids.

BRIEF DESCRIPTION OF THE DRAWING

A preferred form of the present invention will now be described by way of example with reference to the accompanying drawing.

DETAILED DESCRIPTION OF THE PREFERRED EMBODIMENTS

Figure 1:
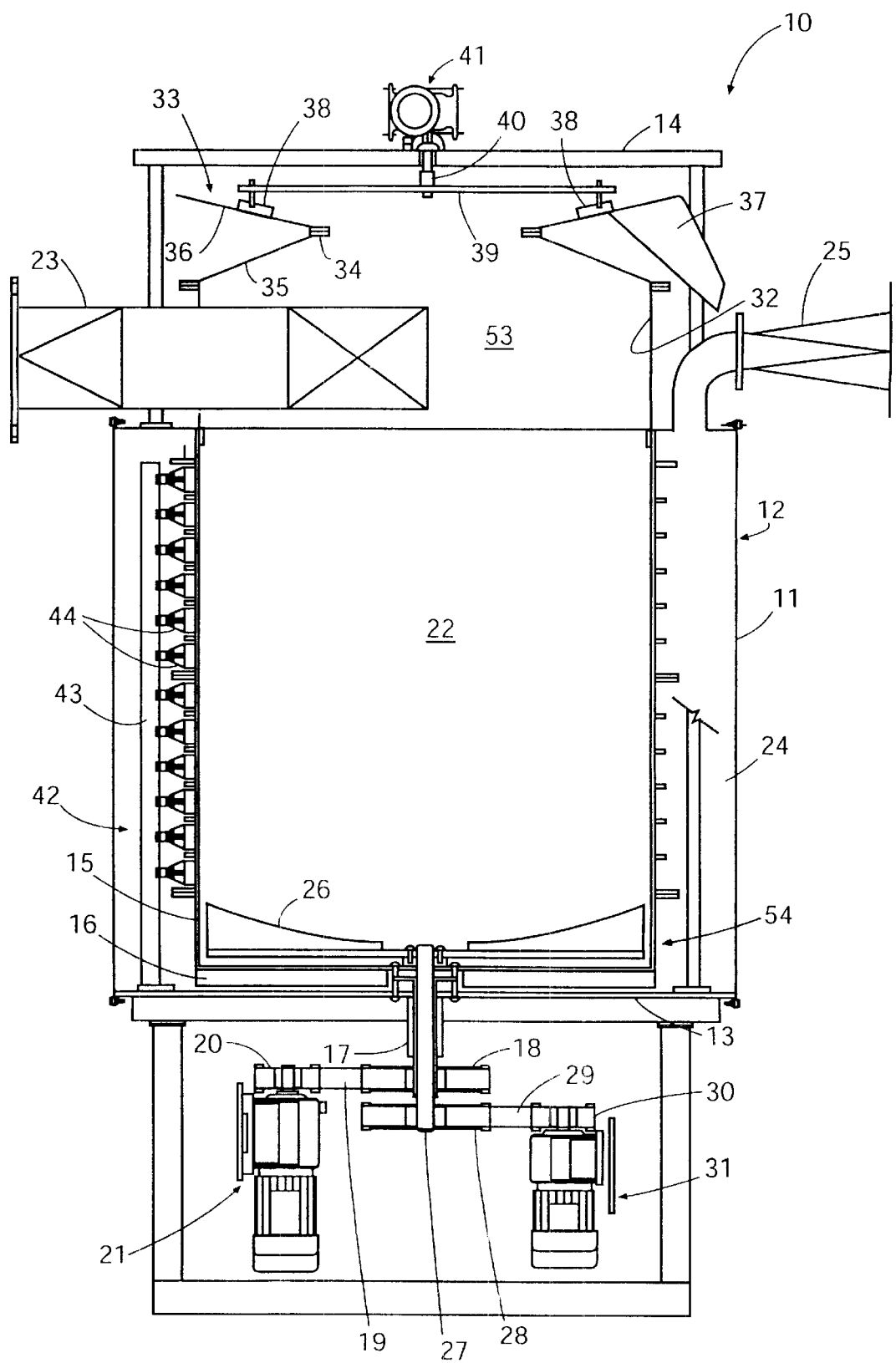
FIG. 1 is a schematic section side elevation of a fine solids separator.

In FIG. 1 of the accompanying drawing there is schematically depicted a fine solids separator 10 configured to remove a large fraction of fine solids down to and even less than 1 micrometer in size. For example, the separator 10 could receive flocculated sewage, which sewage has been previously screened to remove gross solids larger than 1 mm. More particularly there would be added to the sewage stream a coagulant and a flocculant, mixed with the stream and then allowed to mature prior to being delivered to the apparatus 10.

The apparatus 10 includes a hollow housing 12 having an outer generally cylindrical wall 11. The housing 12 further includes a bottom wall. The housing 12 generally encloses a space within which there is located a generally cylindrical screen member 15 (vertical side wall). The screen member 15 is formed of expanded metal mesh providing apertures of a desired size. The size of the apertures determines the efficiency with which solid material can be removed from the liquid stream passing through the apparatus 10. The above mentioned coagulant causes aggregates of fine or neutral density solids that are substantially larger than the apertures of the screen member 15. These aggregates are less likely to blind the screen member 15.

Supporting this cylindrical screen member 15 is a bottom plate 16 supported by means of a hollow shaft 17. The shaft 17 is supported by bearings mounted in the bottom wall 13 so that the shaft 17 can be rotated about its vertical longitudinal axis. The vertical axis of the shaft 17 can generally coincide with the longitudinal axis of the screen member 15.

Attached to the shaft 17 is a pulley 18 driven by means of a belt 19. The belt 19 is driven by a pulley 20 which in turn is driven by an electric motor and gearbox assembly 21. The motor and gearbox assembly 21 is intermittently operated to cause angular movement of the member 15 about the longitudinal axis of the member 15.

The screen member 15 encloses a chamber 22 into which the flocculated sewage is delivered by means of an inlet duct 23. Liquid is then allowed to exit the chamber 22 via the apertures in the screen member 15. The screened liquid collects in the annular outlet chamber 24 to eventually exit the apparatus 10 by the outlet 25. The apertures of the screen member 15 prevent solid matter above a predetermined size passing through the screen member 15 to the outlet chamber 24. The inlet duct 23 is spaced from the longitudinal axis of the screen member 15 and directs the incoming liquid to the upper portion of chamber 22 to aid angular movement of the liquid about the longitudinal axis of the screen member 15.

To inhibit collection of solid material on the screen member 15 and therefore blocking of the apertures, the liquid is caused to move swiftly past the internal surfaces of the screen member 15 by operation of an impeller 26, which augments the energy of the incoming water. The impeller 26 is mounted on a shaft 27 extending through the hollow shaft 17. The shaft 27 is attached to a pulley 28 driven by a belt 29 extending to a pulley 30. The pulley 30 is driven by a gearbox and motor assembly 31. Operation of the assembly 31 causes the impeller 26 to rotate about the longitudinal axis of the shaft 27 and therefore generally about the longitudinal axis of the cylindrical screen member 15. The impeller 26 assists in causing liquid in the chamber 22 to move circumferentially about the longitudinal axis of the screen member 15 and therefore past the internal surfaces of the screen member 15. In this regard it should be appreciated that other means could also be employed to cause liquid contained withing the chamber 22 to move past the internal surface of the screen member 15. The impeller 26 is located adjacent the lower portion 54 of the member 15.

Also located internally of the housing 12 is an internal cylindrical wall 32 which is associated with the upper extremities of the member 15 to inhibit direct transfer of liquid to the outlet chamber 24 apart from via the screen member 15. As the internal wall 32 is stationary, there is preferably provided at the junction of the wall 32 and the screen member 15, a seal to inhibit liquid passing between the wall 32 and screen member 15 to enter the outlet chamber 24. The wall 32 surround a space 53.

Attached to the upper extremities of the wall 32 is a threshold member 33 having a threshold edge 34 above which the floc material will rise. The threshold member 33 includes frusto-conical portions 35 and 36 which diverge radially outwardly from the edge 34.

Extending from the portion 36 is a floc material outlet 37 via which floc material is delivered from within the apparatus 10.

To aid in the delivery of floc material to the outlet 37 there is provided a plurality of scraper blades 38 mounted on a rotatably driven arm 39. The arm 39 is supported by a shaft 40 driven by a motor and gearbox assembly 41 supported on frame 14. Typically the shaft 40 would be generally coaxial with the longitudinal axis of the cylindrical member 15.

The blades 38 are located adjacent or are in sliding contact with the upper surface of the portion 36. Preferably the blades 38 would extend both angularly and radially relative to the longitudinal axis of the shaft 40 so as to aid in moving the floc material radially outwardly towards the outlet 37.

To aid in removing any solid material that may accumulate on the internal surface of the cylindrical screen member 15, there is provided at least one spray assembly 42. The spray assembly 42 includes a hollow duct 43 providing a flow of fluid under pressure to a plurality of nozzles 44. Each of the nozzles 44 provides a stream directed toward the outer peripheral surface of the member 15 and therefore the apertures therein. The streams provided by the nozzles 44 enter and pass through the apertures in the member 15 to aid in removing any collected solid material. The duct member 43 is attached to a pump to provide the fluid under pressure. Typically the fluid would be a liquid such as water, provided either from the mains or from the outlet chamber 24. However in this respect the fluid could also be a gas such as air.

Preferably the spray assembly 42 is only intermittently operated. The operation of the spray assembly 42 would be coordinated with the gearbox and motor assembly 21 so that portions of the member 15 to be "cleaned" by the spray assembly 42 are located at a position adjacent the nozzles 44 when the nozzles 44 are operated.

The above mentioned screen member 15 may be intermittently moved through a predetermined angle or alternatively may be rotated through 360° a number of times at spaced time intervals.

As can be seen from the attached drawing, the head of liquid in the housing 12 is determined by the height of the outlet 25. Accordingly, the flow rate of liquid through the member 15 is determined by the pressure difference across the member 15.

In a particular form of the present invention, the member 15 was provided with a height of 900 cm and a diameter of 900 cm. Such a construction can cater for a flow rate through the apparatus 10 of between 1 liter per second and 30 liters per second. A preferable flow rate would be about 20 liters per second. Typically the impeller would be rotated at about 18 rpm.

In the above particular preferred form of the present invention, when used to treat raw sewage the outlet liquid had the following improvements in water quality parameters. Suspended solids, total phosphorus and turbidity were reduced by about 95%, biological oxygen demand was reduced by 80% to 90%, chemical oxygen demand was reduced by about 80%, and faecal coliforms reduced by about 99.5%.

The outlet sludge stream, from the separator, containing the solids constitutes about 1% of the total inflow. Solids content of the sludge was typically 3–5%.

Figure 2:
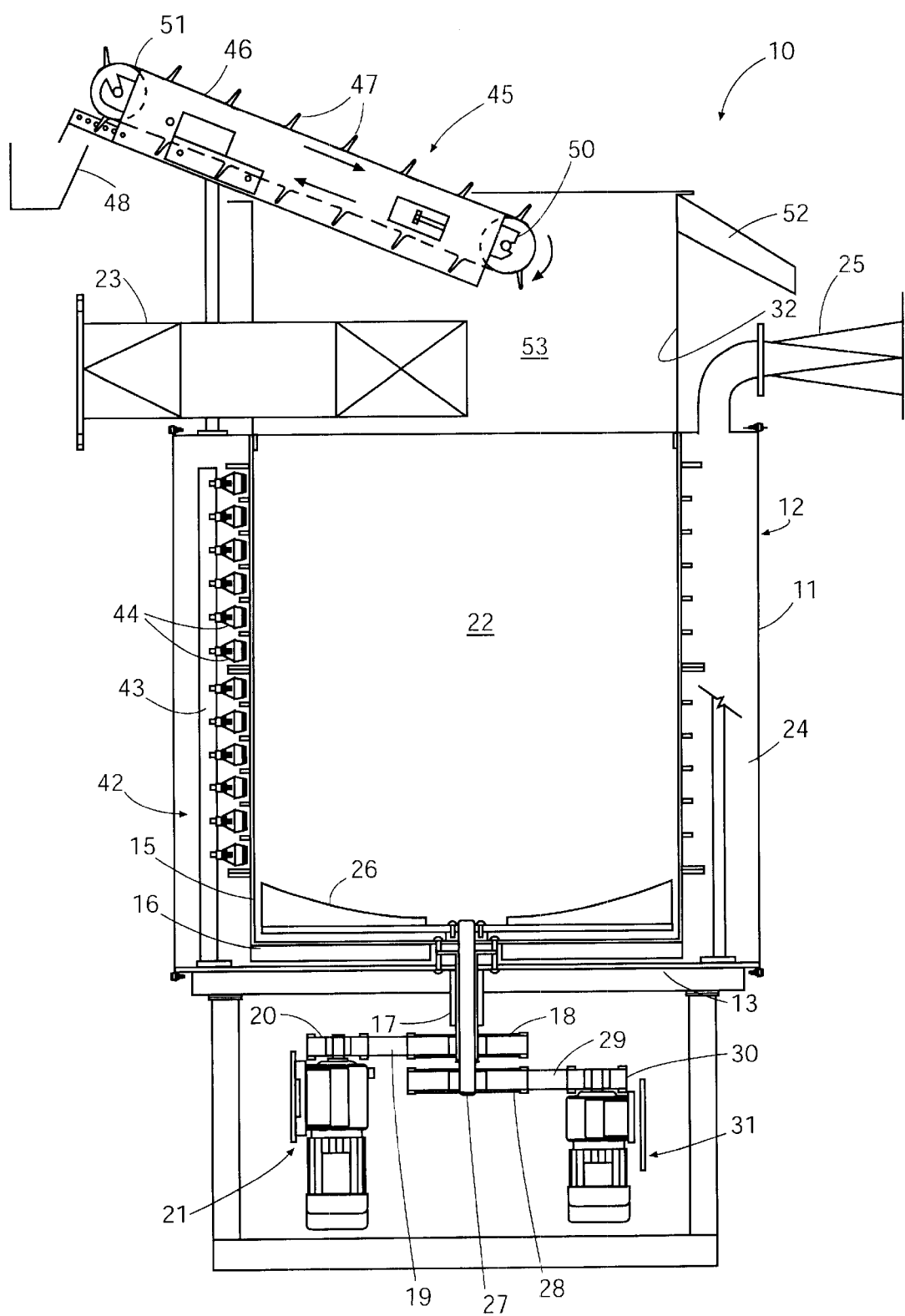
FIG. 2 is a schematic section side elevation of a modification of the separator of FIG. 1.

In FIG. 2 a modification of the separator 10 is depicted. In this embodiment the floc material is removed by means of a conveyor assembly 45. The assembly 45 includes a belt 46 that has a plurality of flanges 47 that engage the floc and move the floc upwardly to an outlet duct 48. The flanges 47 in particular cooperate with a trough 49 having a floor past which the flanges 47 pass. The belt 46 passes between two rotatable drums 50 and 51, of which at least one is driven. Spacing of the drums 50 and 51 would be adjustable so that the belt 46 may be tensioned.

There is further included in this embodiment an overflow duct 52.

What is claimed is:

1. An apparatus to remove solid material from a body of liquid, said apparatus including:

a generally cylindrical wall providing a chamber to receive the liquid, said cylindrical wall having a generally vertical longitudinal axis and including an apertured portion through which the liquid leaves the chamber, the apertured portion being adapted to remove solid material greater than a predetermined size from liquid passing through the apertured portion, and wherein said wall is mounted for rotation about said axis;

a housing generally surrounding said wall and co-operating therewith to provide a space into which the liquid flows from said apertured portion;

liquid drive means to at least partly cause movement of the liquid in the chamber about said axis so that liquid passes the apertured portion to aid in removing solid material therefrom;

a motor to cause said rotation;

means to remove the solid material from within the chamber;

an inlet via which liquid is delivered to said chamber; and an outlet extending from said space so as to maintain a level of liquid in said space and chamber.

2. The apparatus of claim 1 wherein substantially the entire wall provides said apertured portion.

3. The apparatus of claim 2 wherein the cylindrical wall is made of expanded metal mesh.

4. The apparatus of claim 2 wherein the means to cause movement of liquid in the chamber moves the liquid angularly about the longitudinal axis of the cylindrical wall.

5. The apparatus of claim 2 wherein the apparatus includes a spray assembly to direct a stream of fluid toward said cylindrical wall from said space to aid in removing collected solid material.

6. The apparatus of claim 2 wherein said inlet is spaced from said axis so as to direct the liquid to move angularly about said axis and the liquid drive means augments movement of the said incoming liquid and is an impeller rotated about said axis.

7. The apparatus of claim 1 when adapted to receive flocculated sewage, with the apparatus including a threshold member above which floc material passes to be removed from the chamber and therefore provide the means to remove the solid material.

8. The apparatus of claim 7 further including a scraper member is operatively associated with the threshold member to aid in removing the floc material.

9. The apparatus of claim 1, adapted as a solids separator to remove solids down to and even less than 1 micrometer in size.

10. The apparatus of claim 1, adapted to receive flocculated sewage, with said apparatus including a conveyor to engage the floc sewage to deliver it to a position wherefrom it exits from said apparatus.

11. The apparatus of claim 10 further including a floc sewage receiving space above said chamber, and wherein said conveyor extends from said space.

12. The apparatus of claim 11 wherein said wall is a lower wall, and said apparatus includes an upper wall extending upwardly from said lower wall, with said upper wall encompassing a space that receives the floc sewage, with said conveyor extending from said space.

13. The apparatus of claim 11 wherein said conveyor extends upwardly from said space and said apparatus includes an outlet trough to which the floc sewage is delivered by said conveyor.

14. The apparatus of claim 12 wherein said conveyor includes a trough, and a belt having flanges that pass along said trough to move the floc from said space to said trough.

15. The apparatus of claim 1 wherein said inlet delivers the liquid to an upper portion of said chamber.

16. An apparatus to remove solid material from a body of liquid, said apparatus including:

a generally cylindrical wall providing a chamber to receive the liquid, said cylindrical wall having a generally vertical longitudinal axis and including an apertured portion through which the liquid leaves the chamber, the apertured portion being adapted to remove solid material greater than a predetermined size from liquid passing through the apertured portion;

a housing generally surrounding said wall and co-operating therewith to provide a space into which the liquid flows from said apertured portion;

liquid drive means to at least partly cause movement of the liquid in the chamber angularly about said axis so that liquid passes the apertured portion to aid in removing solid material therefrom;

means to remove the solid material from within the chamber;

an inlet via which liquid is delivered to said chamber, said inlet being spaced from said axis so as to direct the liquid to move angularly about said axis, with the liquid drive means augmenting said angular movement; and an outlet extending from said space so as to maintain a level of liquid in said space and chamber.

17. The apparatus of claim 16 wherein the liquid drive means is an impeller driven to rotate about said axis and located adjacent a lower portion of said wall.

18. The apparatus of claim 17 wherein substantially the entire wall provides said apertured portion.

19. The apparatus of claim 18 wherein the cylindrical wall is made of expanded metal mesh.

20. The apparatus of claim 19 wherein the apparatus includes a spray assembly to direct a stream of fluid toward said cylindrical wall from said space to aid in removing collected solid material.

21. The apparatus of claim 16 when adapted to receive flocculated sewage, with the apparatus including a threshold member above which floc material passes to be removed from the chamber and therefore provide the means to remove the solid material.

22. The apparatus of claim 21 further including a scraper member is operatively associated with the threshold member to aid in removing the floc material.

23. The apparatus of claim 16 when adapted as a solids separator to remove solids down to and even less than 1 micrometre in size.

24. The apparatus of claim 16 when adapted to receive flocculated sewage, with said apparatus including a conveyor to engage the floc sewage to deliver it to a position wherefrom it exits from said apparatus.

25. The apparatus of claim 24 further including a floc sewage receiving space above said chamber, and wherein said conveyor extends from said space.

26. The apparatus of claim 25 wherein said wall is a lower wall, and said apparatus includes an upper wall extending upwardly from said lower wall, with said upper wall encompassing a space that receives the floc sewage, with said conveyor extending from said space.

27. The apparatus of claim 25 wherein said conveyor extends upwardly from said space and said apparatus includes an outlet to which the floc sewage is delivered by said conveyor.

28. The apparatus of claim 26 wherein said conveyor includes a trough, and a belt having flanges that pass along said trough to move the floc from said space to said trough.

29. The apparatus of claim 16 wherein said inlet delivers the liquid to an upper portion of said chamber.

\* \* \* \* \*

UNITED STATES PATENT AND TRADEMARK OFFICE
CERTIFICATE OF CORRECTION

PATENT NO. : 6,581,783 B2
DATED : June 24, 2003
INVENTOR(S) : Paul Leslie Blanche et al.

It is certified that error appears in the above-identified patent and that said Letters Patent is hereby corrected as shown below:

<u>Title page,</u>
Item [75], "Paul George Blanche," should read -- Paul Leslie Blanche, --.

<u>Column 5,</u>
Line 26, "is" should be deleted.

<u>Column 6,</u>
Line 33, "is" should be deleted; and
Line 37, "micrometre" should read -- micrometer --.

Signed and Sealed this

Twenty-seventh Day of January, 2004

JON W. DUDAS
*Acting Director of the United States Patent and Trademark Office*